(12) United States Patent
Perreira et al.

(10) Patent No.: US 11,102,060 B2
(45) Date of Patent: Aug. 24, 2021

(54) IDENTIFICATION OF A SOFT FAILURE AT A MEMBER

(71) Applicant: HEWLETT PACKARD ENTERPRISE DEVELOPMENT LP, Houston, TX (US)

(72) Inventors: Mark Perreira, Sunnyvale, CA (US); Bryan P. Murray, Bellevue, WA (US); Jayashree Sundarachar Beltur, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,634

(22) Filed: Jan. 31, 2018

(65) Prior Publication Data

US 2019/0238399 A1    Aug. 1, 2019

(51) Int. Cl.
| | | |
|---|---|---|
| *H04L 12/24* | (2006.01) | |
| *G06F 11/07* | (2006.01) | |
| *H04L 29/08* | (2006.01) | |
| *G06F 11/14* | (2006.01) | |

(52) U.S. Cl.
CPC ...... *H04L 41/0677* (2013.01); *G06F 11/0709* (2013.01); *G06F 11/0751* (2013.01); *G06F 11/1425* (2013.01); *H04L 41/0654* (2013.01); *H04L 67/10* (2013.01)

(58) Field of Classification Search
CPC ....... H04W 84/18–84/22; H04W 4/08; H04W 4/70; H04W 24/02; H04L 67/1044; H04L 67/1048
See application file for complete search history.

(56) References Cited

U.S. PATENT DOCUMENTS

| | | | |
|---|---|---|---|
| 7,730,364 B2 | 6/2010 | Chang et al. | |
| 7,761,745 B2 | 7/2010 | Garbow | |
| 8,595,564 B2 | 11/2013 | Caffrey | |
| 9,424,157 B2 | 8/2016 | Bjorner et al. | |
| 10,223,536 B2* | 3/2019 | Boutnaru | G06F 21/52 |
| 2010/0162036 A1* | 6/2010 | Linden | G06F 11/181 714/4.11 |
| 2013/0215789 A1* | 8/2013 | Lim | H04L 45/04 370/254 |
| 2014/0195860 A1 | 7/2014 | Bjorner et al. | |
| 2016/0380855 A1* | 12/2016 | Mankala | H04L 41/0663 709/224 |
| 2018/0060153 A1* | 3/2018 | Innes | G06F 11/3055 |

(Continued)

OTHER PUBLICATIONS

Zhenghua Xue et al., "A Survey on Failure Prediction of Large-Scale Server Clusters," 8th ACIS International Conference on Software Engineering, Artificial Intelligence, Networking, and Parallel/Distributed Computing, Oct. 10, 2008, pp. 733-738, IEEE.

*Primary Examiner* — Marcus Smith
(74) *Attorney, Agent, or Firm* — Hewlett Packard Enterprise Patent Department (57) ABSTRACT

Examples herein relate to identifying a soft failure at member within a cluster dedicated to a microservice. Examples disclose identifying a statistical evaluation for each member within the cluster. Based on the statistical evaluation, identifying a soft failure among one of multiple members within the cluster. In response to the identification of the soft failure at one of the members within the cluster, performing an action.

22 Claims, 6 Drawing Sheets

(56) References Cited

U.S. PATENT DOCUMENTS

| | | | |
|---|---|---|---|
| 2018/0211168 A1* | 7/2018 | Khurshudov | G06N 5/025 |
| 2018/0211176 A1* | 7/2018 | Khurshudov | G05B 19/406 |
| 2019/0028375 A1* | 1/2019 | Kandula | G06F 11/3006 |
| 2019/0138716 A1* | 5/2019 | Huang | G06F 21/645 |
| 2020/0036596 A1* | 1/2020 | Panda | G06F 3/0632 |

* cited by examiner

IDENTIFICATION OF A SOFT FAILURE AT A MEMBER

BACKGROUND

Failures such as hard failures and soft failures may cause severe degradation to a health of an overall system. Hard failures are those failures at which a component catastrophically fails. Soft failures are an insidious type of failure at which a node degrades such that the performance of the system may be affected.

BRIEF DESCRIPTION OF THE DRAWINGS

In the accompanying drawings, like numerals refer to like components or blocks. The following detailed description references the drawings, wherein.

DETAILED DESCRIPTION

In a traditional monolithic system architecture, functional tasks on the system are placed into a single program for execution. Different functional tasks may take up different processing power capabilities, thus the monolithic system architecture may not be efficient. For example, encryption/decryption takes more processing power than archiving data. Yet, the different processing capabilities for the different functional tasks are not considered when executing the single program.

In a more modern service-oriented system architecture, tasks are broken up into functional pieces for execution. These tasks are grouped according to its function and clustered into each container. One approach to the services-oriented architecture is microservices. Microservices include a collection of these similar functional tasks which run on members (e.g., nodes) within the cluster. Running similar functional tasks on a group of members within the cluster, allows more efficient processing power capability.

In these system architectures, components executing the aforementioned tasks eventually experience component failure, also referred to as a hard failure. Cluster management techniques are used to recover from these hard failure scenarios. With hard failure scenarios, when a hardware component fails, the cluster manager detects and recovers the cluster via creation of a new component member on the infrastructure foundation. The cluster manager and the infrastructure may be designed with redundancy to safeguard against the hard failures. Soft failures in a clustered architecture are more insidious as the system suffers degradation until a hard failure occurs. Additionally, many programs are written in many layers such as firmware, operating system, language runtime, application framework, application code, etc. Over time, the chances increase that a soft failure occurs in one of the layers.

Approaches to a detection of the soft failure involve monitoring of the components within the system. In the monitoring approach, when a component strays from an expected performance, an evaluation is performed to locate the root cause. Remediation is done from the root cause and the system is updated. However, this approach takes much time to locate the root cause and update the system.

Accordingly, the present disclosure identifies a soft failure at a member within a cluster that is dedicated to a microservice. The disclosure calculates a statistical value for each member based on collected metrics. Based on the statistical value, the disclosure detects a failure among one of the members within the cluster. In response to the detection of the failure, an action is performed so that the cluster continues execution of the microservice.

In another example, an action is selected for performance may be performed at the identified member suffering the soft failure. The list of example actions include a recycle of the member (e.g., destroy and restart), scale out the cluster by adding in an additional member, and scale in the cluster by removing the member. Each of these examples are actions that allow the cluster to continue execution of the microservice with minimal disruption. This allows the other members to continue execution of the microservice without bringing down the full cluster in response to an identified member experiencing the soft failure.

In another example, a computing device instructs each of the members within the cluster dedicated to the microservice to perform the recycle in a reporting cycle. In this example, the recycles are completed in a randomized fashion so that each member includes a staggering start time. This means the recycle for one member may be performed prior or after a recycle of another member is complete. Instructing each member to perform the recycle in the randomized fashion provides diversity of the data. Diversity of the data provides security against the situation in which all the members in the cluster may be experiencing soft failure together.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "multiple," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on. Additionally, the term "soft failure" is understood to mean a degradation of a system and/or component over time. As such, the terms "soft failure," and "degradation" may be used interchangeably throughout. Further, the term "microservice" is understand to include functionally similar tasks that are executed on members dedicated to that execution within a computing system. Also, the terms "given" member and "identified" member is understood to mean the member under analysis and as such may be used interchangeably throughout.

The foregoing disclosure describes a number of example implementations for identify a member, among multiple members within a cluster dedicated to a microservice, that may be experiencing a soft failure. The disclosed examples may include systems, devices, computer-readable storage media, and methods for detecting the member suffering the soft failure. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Figure 1:
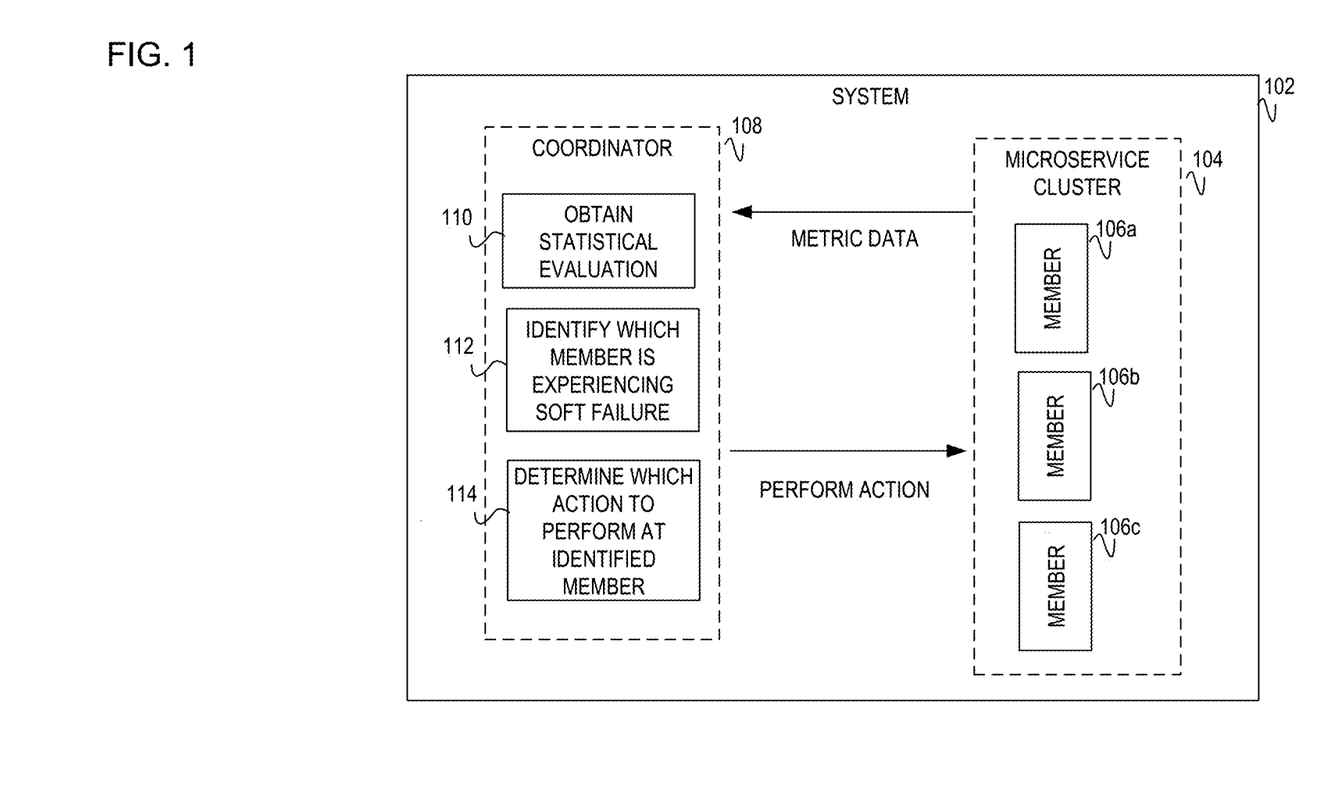
FIG. 1 illustrates an example system that includes a cluster and members that are dedicated to execution of a microservice in accordance with the present disclosure.

FIG. 1 illustrates an example system 102 including cluster 104 and members 106a-106c dedicated to execution of a microservice. System 102 includes coordinator 108 which obtains metric data over each member 106a-106c. Coordinator 108 obtains metric data and in turn, determines a statistical evaluation for each member 106a-106c. Determining the statistical evaluation, coordinator 108 can identify which member 106a, 106b, or 106c is experiencing a soft failure. In response to identifying which member 106a, 106b, or 106c is experiencing the soft failure, coordinator 108 proceeds to determine an action to perform at that member and relays instructions, accordingly.

System 102 represents a computing system capable of that enables communications between cluster 104 and coordinator 108 such that coordinator 108 identifies which member 106a-106c is experiencing the soft failure. As such, implementations include service-oriented architectural system, server, containerized computing system, operating system level virtualization, or other type of computing (virtual or non-virtual) architecture capable of hosting cluster 104 that is dedicated to a specific microservice. Although system 102 illustrates a single system including cluster 104 and coordinator 108, implementations should not be so limited as this was done for illustration purposes. For example, cluster 104 may be hosted on one computing system while coordinator hosted on another computing system.

Cluster 104 includes members 106a-106c and represents a computing system that runs the microservice. As such, cluster 104 is dedicated to a specific microservice from which members 106a-106c execute that specific microservice. In this implementation, members 106a-106 each perform functionally similar tasks. In a more specific implementation, members 106a-106c each perform the same task to achieve completion of the specific microservice. In implementations, cluster 104 includes a container, partition, virtualization engine, jail (e.g., FreeBSD jail, chroot jail) that may look like a computer from that specific microservice. For example, the microservice running on a physical computer, can see the resources such as connected devices, memory, files, folder, network shares, CPU power, hardware capabilities of that physical computer. In the present instance, microservice(s) running on cluster(s) 104 are limited to view the cluster's 104 contents and members 106a-106c assigned to cluster 104.

Members 106a-106a represent nodes within system 102 that execute functionally similar tasks such that cluster 104 is considered dedicated to the overall task (e.g., microservice). Members 106a-106c may experience a reduced level of performance which is referred to as the soft failure. The soft failure includes a degradation to members 106a-106c that occur over time. As such, members 106a-106c report metric data to coordinator 108 such that the metric data includes health information over how each member 106a-106c performs over one or more cycles. Metric data includes, by way of example, a rate of flow of messages, data collection, processing power, archival rates, risk of failure, how quickly the given member 106a, 106b, 106c is executing the task for the overall microservice, communications from the member 106a, 106b, 106c, the number of cycles each member 106a, 106b, 106c is performing within a period of time, total number of processing threads available, number of occupied processing threads, a total number of messages processed by the member, among others. Members 106a-106c represent those nodes that either each perform the specific microservice or each perform the functionally similar task that contributes to the overall microservice. Implementations of members 106a-106c include a circuit node, hardware that implements the microservice such as a physical circuit, programmable circuit, processing resource, chipset, controller, semiconductor, or other type of hardware capable of executing functionally similar tasks in cluster 104 to complete the specific microservice. In other implementations, members 106a-106c may include a virtualized node or virtualized member. In this implementation, instructions are executed by a hardware device (e.g., processor, controller) that members 106a-106c are hosted by a computing system's resources. Although FIG. 1 illustrates members 106a-106c as co-located to one another, this was done for illustration purposes as member 106a may be hosted by one computing system's resources, while members 106b-106c may be hosted by a different computing system's resources. This allows members 106a-106c to group together based on executing on functionally similar tasks and not constrained by physical location.

Coordinator 108 receives metric data over members 106a-106c within the cluster 104 that execute the specific microservice. Coordinator 108 utilizes the metric data to obtain the statistical evaluation as at module 110. The statistical evaluation provides an analysis to compare the given member 106a, 106b, or 106c to the other members within cluster 104. As such, the statistical evaluation is a mechanism used to infer the proportion of an individual member 106a, 106b, or 106c to the collective members 106a-106c. Using the statistical evaluation, coordinator 108 can diagnose which member 106a, 106b, or 106c is suffering from the soft failure. In response to identifying the member, coordinator 108 deploys the action to be performed at the identified member. Implementations of coordinator 108 include, electronic circuitry (i.e., hardware) such an integrated circuit, programmable circuit, application integrated circuit (ASIC), controller, processor, semiconductor, processing resource, chipset, or other type of hardware component capable of the obtaining the statistical evaluation, identifying the member from the statistical evaluation, and deploying the action for performance that the member. Alternatively, coordinator 108 may include instructions (e.g., stored on a machine-readable medium) that, when executed by a hardware component (e.g., controller and/or processor) determines which action to deploy for performance at the member, accordingly.

Modules 110-114 identify which member 106a, 106b, or 106c is suffering the soft failure based on the statistical evaluation and in turn, determines which action to perform at the identified member. The statistical evaluation may be calculated by coordinator 108 from metric data. From the statistical evaluation, coordinator 108 can identify which member is experiencing the soft failure. In response, coordinator 108 In one implementation, coordinator 108 applies a policy. The policy indicates which action to perform among multiple actions. For example, there may be multiple possible actions including: a recycle wherein the identified member is destroyed and recreated within cluster 104 or a different cluster (not illustrated); cluster 104 may be scaled in wherein the identified member is removed from cluster 104; cluster 104 may be scaled out wherein another member (not illustrated) is built into cluster 104; and restart of the identified member. The selection of the actions may be determined by the policy. The policy is a set of rules that tells coordinator 108 which action to deploy to the identified member. By way of, if the statistical evaluation is above a threshold, the action may include performing the scale in of cluster 104 and/or restart; if the statistical evaluation is below the threshold, then coordinator 108 may deploy the recycle and/or scaling out cluster 104 with the additional member. These implementations may be explained in detail in later figures. Modules 110-114 may include, by way of example, instructions (e.g., stored on a machine-readable medium) that, when executed (e.g., by coordinator 108), implements the functionality of modules 110-114. Alternatively, or in addition, modules 110-114 may include electronic circuitry (i.e., hardware) that implements the corresponding functionality.

Figure 2:
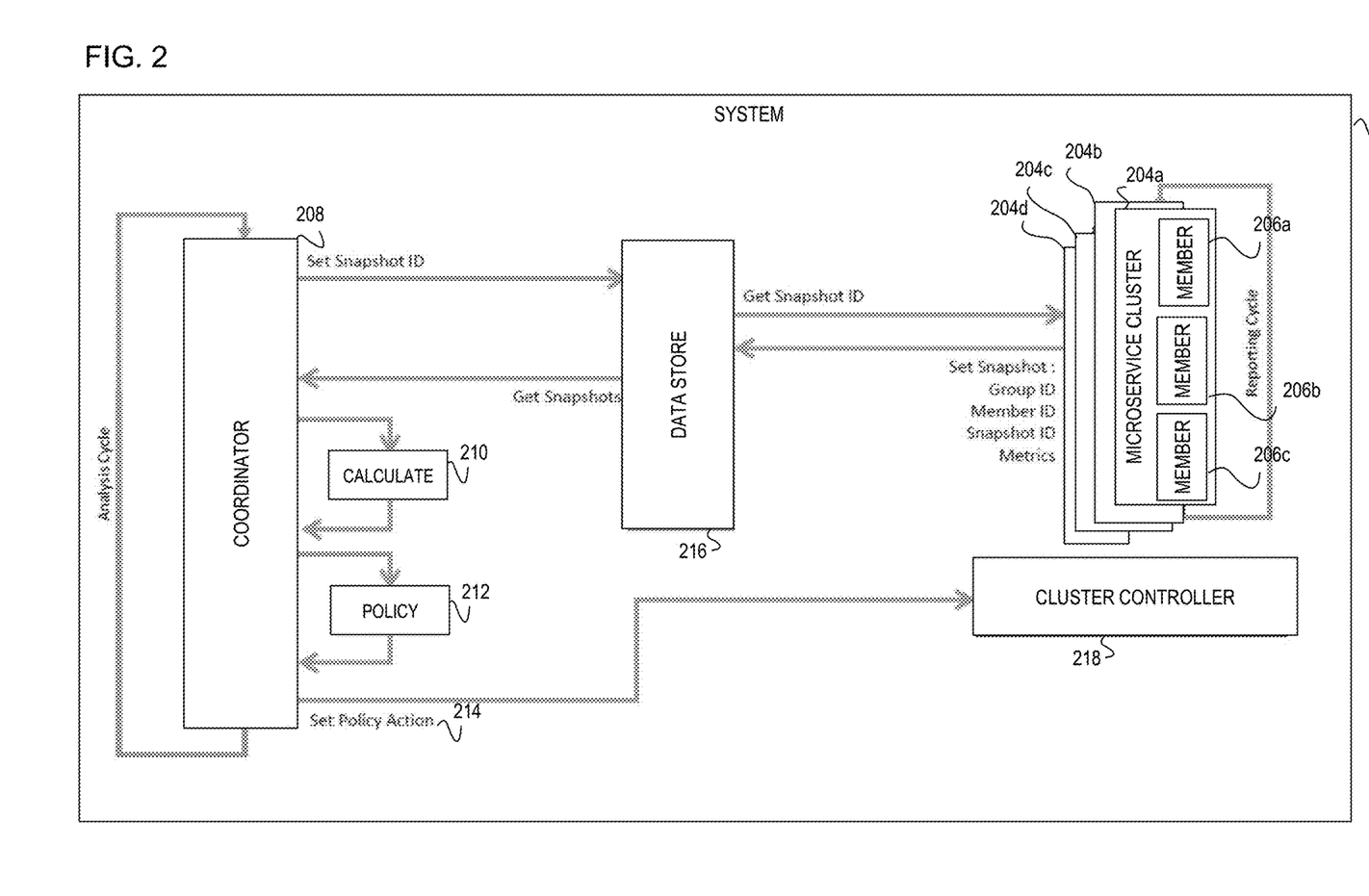
FIG. 2 illustrates an example system that includes various clusters each dedicated to a different microservice in accordance with the present disclosure.

FIG. 2 illustrates an example system 202 including various clusters 204a-204d, each including a different set of members 206a-206c. Each cluster 204a-204d is dedicated to a different microservice such that the grouping of members 206a-206c for each cluster 204a-204d execute functionally similar tasks that correspond to a specific microservice. By way of example, cluster 204a includes members 206a-206c dedicated to one microservice, while cluster 204b includes different member (not illustrated) and dedicated to execution of a different microservice. Members 106a-106c within respective cluster 204 perform a reporting cycle in which metric data is collected and stored by data store 216.

Data store 216 collects and stores metric data and other information that identifies members 206a-206c and respective clusters 204a-204d. Data store 216 may initiate a request (e.g., Get Snapshot ID) to various clusters 204a-204d. Clusters 204a-204d which are each dedicated to a different microservice in turn completes a reporting cycle. For example members 206a-206c that are dedicated to cluster 204a respective performs a reporting cycle during which cluster 204a and/or members 206a-206c transmits the identification of that cluster, identification of each member 206a-206c, and metric data to data store 216. In one implementation, the reporting cycle may include a recycle at each member 206a-206c on a random basis at staggering times so that the metric data creates data diversity. This implementation is explained in detail in a later figure.

Coordinator 208 collects the metric data from data store 216 and proceeds to calculate the statistical evaluation from the metrics at module 210. Coordinator 208 collects metric data and identifying information so that coordinator 208 can identify which member 206a-206c and/or cluster 204a-204d is under analysis. As such, coordinator 208 performs an analysis cycle per member and/or per cluster. Initially, coordinator 208 may transmit a notification to data store 216 specifying the metric data from which cluster and which member (e.g., Set Snapshot ID). In turn, data store 216 transmits the requested data to coordinator 208. Coordinator 208, in turn performs the analysis cycle to calculate the statistical evaluation. Using the statistical evaluation, coordinator 208 compares to a policy that includes a set of rule(s) to determine which action to perform as at module 212. Modules 210-214 may include, by way of example, instructions (e.g., stored on a machine-readable medium) that, when executed (e.g., by coordinator 208), implements the functionality of modules 210-214. Alternatively, or in addition, modules 210-214 may include electronic circuitry (i.e., hardware) that implements the corresponding functionality.

Cluster controller 218 manages each cluster 204a-204d dedicated to the various microservices. In response to coordinator 208 identifying the action to perform, coordinator 208 sets the policy action for deployment at the identified member. Cluster controller 218 receives the policy action and in turn, deploys that action at the identified member within one of clusters 204a-204d.

Figure 3:
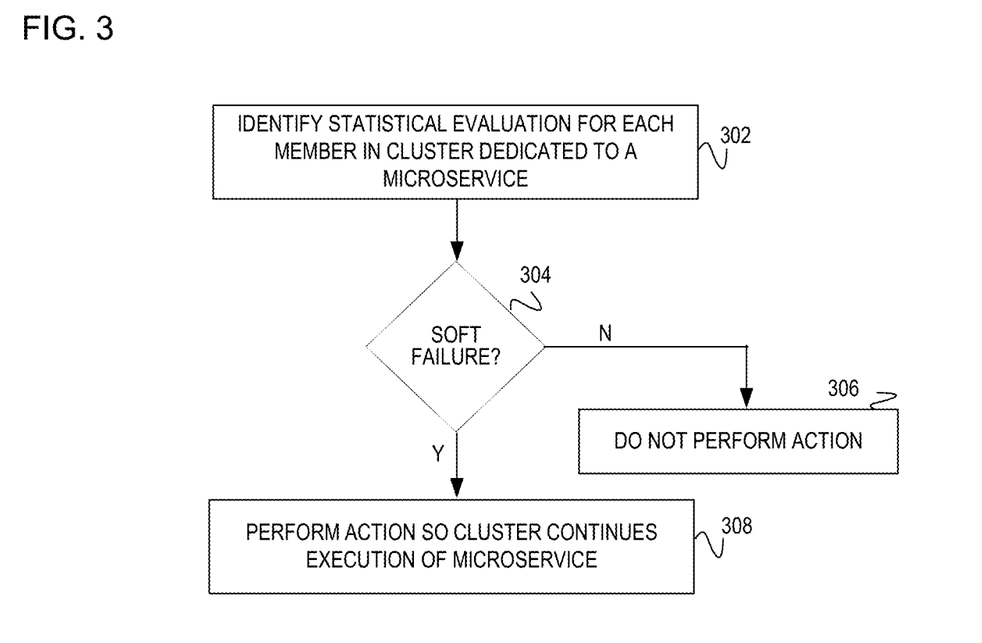
FIG. 3 illustrates an example flow diagram executable by a computing device to identify a soft failure at one of multiple members in a cluster dedicated to a microservice in accordance with the present disclosure.
Figure 4:
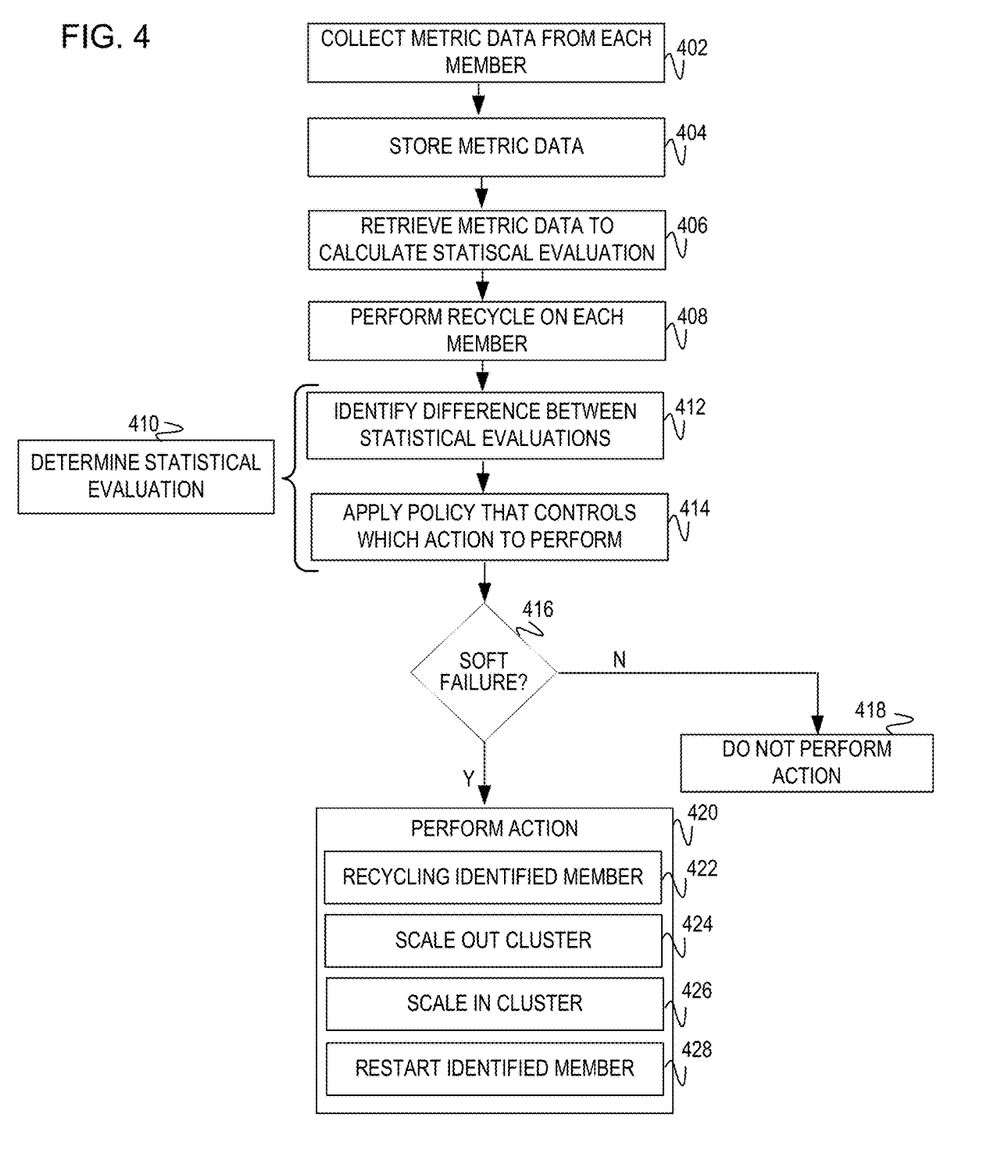
FIG. 4 illustrates an example flow diagram executable by a computing device to perform an action at a member experiencing a soft failure within a cluster in accordance with the present disclosure.

Referring now to FIGS. 3 and 4, flow diagrams are illustrated in accordance with various examples of the present disclosure. The flow diagrams represent processes that may be utilized in conjunction with various systems and devices as discussed with reference to the preceding figures. While illustrated in a particular order, the flow diagrams are not intended to be so limited. Rather, it is expressly contemplated that various processes may occur in different orders and/or simultaneously with other processes than those illustrated. As such, the sequence of operations described in connection with FIGS. 3-4 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

FIG. 3 is a flow diagram, executable by a computing device, to perform an action at a member of a cluster that is experiencing a soft failure. In discussing FIG. 3, references may be made to the components in FIGS. 1-2 to provide contextual examples. In one implementation, coordinator 108 and 206 as in FIGS. 1-2 executes operations 302-308 to perform the action at the member suffering the soft failure. In another implementation, coordinator 104 and cluster 108 operate in conjunction to execute operations 302-308. Although FIG. 3 is described as implemented by the computing device, it may be executable on other suitable hardware components. For example, FIG. 3 may be implemented in the form of executable instructions on a machine-readable storage medium 504 and 604 as in FIGS. 5-6.

At operation 302, the computing device identifies the statistical evaluation for a given member among multiple members dedicated to the microservice. In one implementation, the computing device calculates the statistical evaluation. This implementation includes calculating the statistical evaluation for each of the multiple members within the cluster and calculating the average statistical evaluation for the group of multiple members. The average statistical evaluation provides a baseline measurement for the computing device to compare against for the given member. The computing device may proceed to identify the difference between the statistical evaluation for the given member and the average statistical evaluation for the group of the multiple members. The difference allows the computing device to apply a policy that controls which action to perform at the given member. For example, if the difference is high, that would indicate to scale in the cluster and remove that member from the cluster. If the difference is minimal, that would indicate a recycle of that given member (e.g., destroyed and recreated). If the difference is moderate, that would indicate to scale out the cluster and add in an additional member into the cluster. Each of these examples are actions that allow the cluster to continue execution of the microservice with minimal disruption. This allows the other members to continue execution of the microservice without bringing down the full cluster in response to an identified member experiencing the soft failure. Calculating the statistical evaluation may include obtaining metric data from each member and calculating the average metric for that given member. As such implementations include using a mathematical formula, probability, analyzing numerical data for inferring proportions for that member compared to those members operating in the full cluster.

At operation 304 based on the identified statistical evaluation, the computing device detects if the given member is suffering the soft failure. In keeping with the previous example, operation 304 identifies the difference for the average statistical evaluation for the group of members and for the given member. This difference indicates whether the member is experiencing the soft failure. In response to the detection that the given member is experiencing the soft failure, the computing device performs an action at that given member as at operation 308. In response to the computing device determining that the given member is not experiencing the soft failure, the computing device does not perform the action at the given member as at operation 306.

At operation 306 in response to the computing device not detecting the soft failure, the computing device does not perform the action. In keeping with the previous implementation, assuming the difference between statistical evaluations is negligible, this may indicates that the given member is not experiencing the soft failure. In this operation, the given member continues execution of the microservice with the other multiple members without interference from the computing device.

At operation 308 in response to detecting that the given member is experiencing the soft failure, the computing device performs the action so that the other members within that cluster continues execution of the microservice. Examples of the action to perform at that given member include performing a recycle (e.g., destroyed and recreated), scaling the cluster out by adding in an additional member, and scaling in the cluster by removing the given member. In implementation, based on calculating the difference between the statistical evaluations, a policy is applied. The policy indicates which of the actions to perform at the given member. For example, the policy may give a threshold so that if the amount of the difference is higher than the threshold, this may indicate to remove the member from the cluster. In another example of the policy, if the amount of the difference is lower than the threshold, the recycle may be performed at the given member. In this manner, the policy controls which of the actions should be performed at the given member. This implementation is explained in details in a later figure.

FIG. 4 is a flow diagram illustrating a method, executable by a computing device, to select an action among multiple actions to perform at a member experiencing a soft failure. In discussing FIG. 4, references may be made to the components in FIGS. 1-2 to provide contextual examples. In one implementation, coordinator 108 and 208 as in FIGS. 1-2 executes operations 402-428 to perform the action at the member suffering the soft failure. In another implementation, coordinator 104 and cluster 108 operate in conjunction to execute operations 402-428. Although FIG. 4 is described as implemented by the computing device, it may be executable on other suitable hardware components. For example, FIG. 4 may be implemented in the form of executable instructions on a machine-readable storage medium 504 and 604 as in FIGS. 5-6.

At operation 402, the computing device collects metric data from each member within the cluster dedicated to the microservice. The metric data is health information for each of the members and how each member is performing over time. The metric data indicates the execution performance of each member over time that may indicate a slow degradation of the member. As such, the metric data may include a rate of flow of messages, data collection, processing power, archival rates, risk of failure, how quickly the given member is executing the task for the overall microservice, communications from the member, the number of cycles each member is performing within a period of time, total number of processing threads available, number of occupied processing threads, a total number of messages processed by the member, among others. In another implementation, the metric data is collected based on a random recycle such that each member is restarted at staggering times as at operation 408. In this example, one member may perform a recycle and based on completion, another member performs the recycle. This provides diversity in the data so that the computing device is able to observe how each member performs over time as compared to the overall health of the cluster.

At operation 404, the computing devices stores the metric data in a storage area in a computing system. The metric data is collected over time from each of the members within the cluster. In this example, metric data may be collected and stored until retrieval to calculate the statistical evaluations. Storing the metric data allows the data to accumulate over time to observe how each member is changing relative to one another.

At operation 406, the computing device retrieves the metric data from storage. The computing devices uses the metric data to calculate the statistical evaluation for any given member. As such, the computing may proceed to also calculate the average statistical evaluation for the group of members within the cluster as at operation 410.

At operation 408, the computing device instructs each of the members within the cluster dedicated to the microservice to perform a recycle. The computing device instructs each of the members in a randomized order, so that recycles can be performed in staggering manner. This means the recycle for one member may be performed prior or after a recycle of another member is complete. As explained earlier, instructing each member to perform the recycle in the randomized fashion provides diversity of the data. Diversity of the data provides security against the situation in which all the members in the cluster may be experiencing soft failure together.

At operation 410, the computing device determines the statistical evaluation for each member within the cluster. Determining the statistical evaluation includes calculating a value for each member such that inferences can be made about that member as compared to the overall group of members within the cluster. The computing device may collect information and calculate an average and deviation across the instances of the members executing that microservice. The calculated evaluation is compared to the average statistical evaluation to detect the degrading member of the cluster. In this manner, statistical analysis is used across members within the cluster executing similar tasks and therefore, similar workloads. In this operation, statistical analysis is performed for each member dedicated to that microservice in the cluster. In a further implementation, this may include identifying a difference between the statistical evaluation and the average evaluation of the group. In this implementation, each member is compared to the group of members as a whole as at operation 412. Based on the difference, the computing device may apply a policy that includes rule(s) that indicate which action to perform as at operation 414.

At operation 416, based on determining the statistical evaluation for the given member (e.g., identified member), the computing device determines if that given member is experiencing the soft failure. In response to determination that the given member is suffering the soft failure, the computing device proceeds to perform one or more of the actions listed in operation 422-428. In response to the determination that the given member is not experiencing the soft failure, the computing device proceeds to operation 418 and does not interfere with the execution of the microservice at that given member. Operation 416 may be similar in functionality to operation 304 as in FIG. 3.

At operation 418 in response to the determination the given member is not experiencing the soft failure, the computing device may not perform an action. Alternatively, the computing device may continue monitoring that given member to ensure there is no soft failure. As such, the computing device does not interfere with the functional task(s) that given member is executing. Operation 418 may be similar in functionality to operation 306 as in FIG. 3.

At operation 420 in response to the computing device determining that the given member is experiencing the failure, the computing device identifies which of the list of actions at 422-428 to perform. In this implementation, the computing device applies the policy as at operation 414 that controls which of the actions at operations 422-428 to perform. As explained previously, the policy may use either the statistical evaluation of the individual given member of the difference between the average statistical evaluation for the cluster and the individual member. Operation 420 may be similar in functionality to operation 308 as in FIG. 3.

Operations 422-428 in response to the determination that the given member has experienced the soft failure, the computing device provides an instruction to perform one the listed actions. The listed actions to perform at the given member include: performing a recycle during which the given member is destroyed and then recreated through instructions; scaling out the cluster by adding an additional member dedicated also dedicated to execution of the microservice along with the other members; scaling in the cluster by removing the given member; and destroying the given member from which the member may not be able to be recreated to other clusters.

Figure 5:
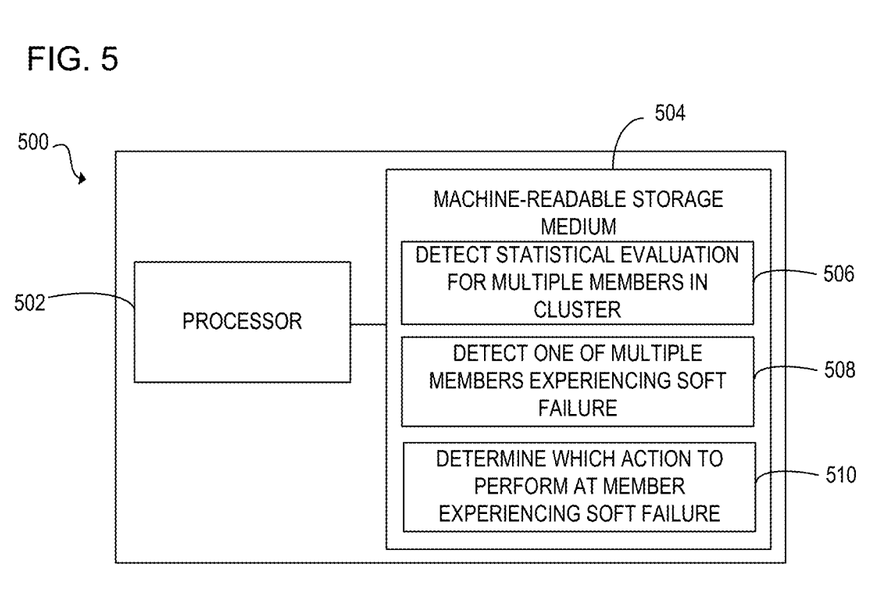
FIG. 5 is a block diagram of an example computing device with a processing resource to execute instructions in a machine-readable storage medium for determining which action to perform a member experiencing a soft failure in accordance with the present disclosure.
Figure 6:
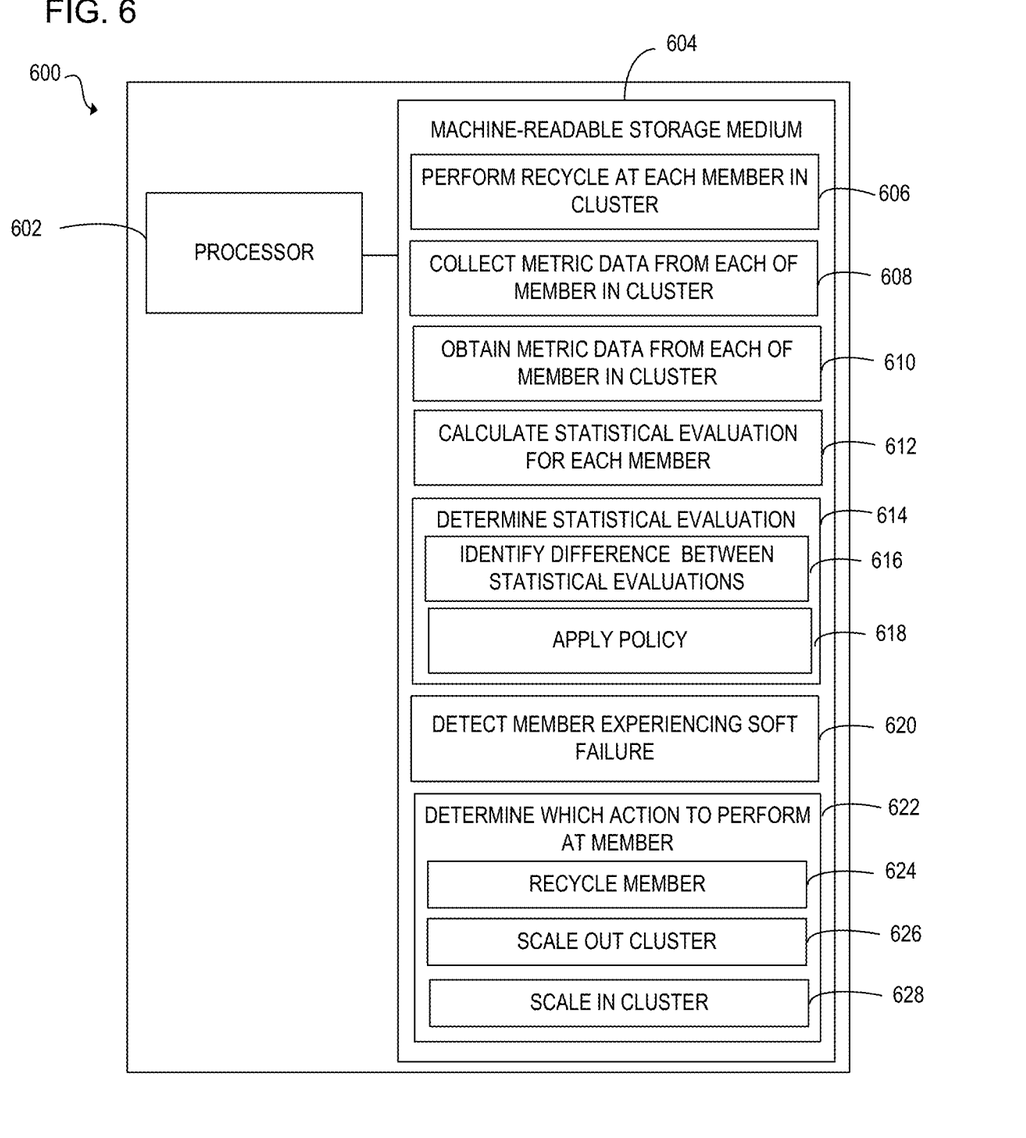
FIG. 6 is a block diagram of an example computing device with a processing resource to execute instructions in a machine-readable storage medium to determine which action to perform at a member experiencing a soft failure based on obtaining metric data from each member among multiple members in a cluster and calculating a statistical evaluation in accordance with the present disclosure.

Referring now to FIGS. 5-6, example block diagrams of networking devices 500 and 600 with processing resources 502 and 602 are illustrated to execute machine-readable instructions in accordance with various examples of the present disclosure. The machine-readable instructions represent instructions that may be fetched, decoded, and/or executed by respective processing resources 502 and 602. While illustrated in a particular order, these instructions are not intended to be so limited. Rather, it is expressly contemplated that various instructions may occur in different orders and/or simultaneously with other instructions than those illustrated in FIGS. 5-6.

FIG. 5 is a block diagram of computing device 500 with processing resource 502 to execute instructions 506-510 within machine-readable storage medium 504. Although networking device 500 includes processing resource 502 and machine-readable storage medium 504, it may also include other components that would be suitable to one skilled in the art. For example, computing device 500 may include a controller, memory storage, or other suitable type of component. The computing device 500 is an electronic device with processing resource 502 capable of executing instructions 506-510 and as such embodiments of the computing device 500 include a networking device such as a server, switch, router, wireless access point (WAP), or other type of networking device. Other embodiments of the computing device 500 include an electronic device such as a laptop, personal computer, mobile device, or other type of electronic device capable of executing instructions 506-510. The instructions 506-510 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processing resource 502 may fetch, decode, and execute instructions 506-510 detect one of the members within the cluster experiencing the soft failure. Specifically, the processing resource 502 executes instructions 506-510 to: detect a statistical evaluation for each of multiple members within the cluster dedicated to executing the microservice; based on the statistical evaluation, detect which of the multiple members within the cluster that is experiencing the soft failure; and determine which action among multiple actions to perform at the member experiencing the soft failure.

The machine-readable storage medium 504 includes instructions 506-510 for the processing resource 502 to fetch, decode, and execute. In another embodiment, the machine-readable storage medium 504 may be an electronic, magnetic, optical, memory, storage, flash-drive, or other physical device that contains or stores executable instructions. Thus, machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 504 may include an application and/or firmware which can be utilized independently and/or in conjunction with processing resource 502 to fetch, decode, and/or execute instructions of machine-readable storage medium 504. The application and/or firmware may be stored on machine-readable storage medium 504 and/or stored on another location of networking device 500.

FIG. 6 is a block diagram of computing device 600 with processing resource 602 to execute instructions 606-616 within machine-readable storage medium 604. Although networking device 600 includes processing resource 602 and machine-readable storage medium 604, it may also include other components that would be suitable to one skilled in the art. For example, computing device 600 may include a controller, memory storage, or other suitable type of component. The computing device 600 is an electronic device with processing resource 602 capable of executing instructions 606-628 and as such embodiments of the computing device 600 include an electronic device such as a server, switch, router, wireless access point (WAP), laptop, personal computer, or other type of computing device. Other embodiments of the computing device 600 include an electronic device such as a computing device, or other type of electronic device capable of executing instructions 606-628. The instructions 606-628 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processing resource 602 may fetch, decode, and execute instructions 606-628 to determine which action to perform at the member experiencing the soft failure. Specifically, the processing resource 602 executes instructions 606-628 to: in a random fashion, perform a recycle at each member so metrics are collected at different times from one another; collect and/or obtain metric data from each of the multiple members within the cluster dedicated to the microservice; calculate the statistical evaluation for each of the multiple members within the cluster including identify a difference in the statistical evaluation for a given member compared to the average statistical evaluation of the group of multiple members; based on the difference, apply a policy such that if the difference is above a threshold or below the threshold, the difference controls which action to perform; detect the member within the group of multiple members experiencing a soft failure; and determine which action to perform including a member recycle, scale out the cluster by adding a member, or scale in the cluster by removing a member.

The machine-readable storage medium 604 includes instructions 606-628 for the processing resource 602 to fetch, decode, and execute. In another embodiment, the machine-readable storage medium 604 may be an electronic, magnetic, optical, memory, storage, flash-drive, or other physical device that contains or stores executable instructions. Thus, machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, machine-readable storage medium 604 may include an application and/or firmware which can be utilized independently and/or in conjunction with processing resource 602 to fetch, decode, and/or execute instructions of machine-readable storage medium 604. The application and/or firmware may be stored on machine-readable storage medium 604 and/or stored on another location of networking device 600.

Although certain embodiments have been illustrated and described herein, it will be greatly appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a variety of ways. This application is intended to cover adaptions or variations of the embodiments discussed herein. Therefore, it is manifestly intended that embodiments be limited only by the claims and equivalents thereof.

We claim:

1. A method, comprising:
   collecting metric data associated with a cluster comprising a plurality of member computing nodes, the metric data including first metric data associated with a first member of the cluster, the cluster executing a dedicated microservice of a service-oriented system architecture, the microservice comprising a collection of similar functional tasks;
   performing a recycle on each member of the cluster on a random basis to diversify the metric data, wherein the recycle performed on each member of the cluster is staggered with respect to the recycle performed on at least one other member of the cluster;
   calculating a statistical evaluation for the first member based on at least the first metric data, the statistical evaluation representing an inferred proportion value of the first member to collective members of the cluster;
   calculating a baseline measurement for the collective members of the cluster;
   comparing, by a coordinator associated with but separate from the cluster of computing nodes, the statistical evaluation for the first member with the baseline measurement;
   identifying a soft failure at the first member based on a difference between the statistical evaluation and the baseline measurement; and
   in response to identifying the soft failure at the first member, performing an action associated with a cluster management technique of the service-oriented system architecture to enable the cluster of computing nodes to continue to execute the microservice despite the soft failure at the first member.

2. The method of claim 1 comprising:
   collecting second metric data from each of the collective members;
   storing the second metric data within a data store; and
   retrieving the second metric data from the data store to calculate the statistical evaluation for each member of the collective members.

3. The method of claim 1 wherein performing the action includes at least one of the following: recycling the first member, scaling out the cluster by adding a second member, or scaling in the cluster by removing the first member.

4. The method of claim 2 comprising:
   performing the microservice among the collective members within the cluster for multiple cycles; and
   collecting third metric data over the multiple cycles for each member within the cluster.

5. The method of claim 1, further comprising:
   identifying, based on the difference between the statistical evaluation and the baseline measurement, a policy that controls the action to perform for the identified soft failure.

6. The method of claim 1, wherein the cluster is a first cluster and the microservice is a first type of microservice, and wherein a second cluster different from the first cluster is dedicated to a second type of microservice.

7. The method of claim 1 wherein performing the action to enable the cluster to continue to execute the microservice comprises:
   restarting the first member at which the soft failure was identified.

8. The method of claim 1 wherein the similar functional tasks are tasks with similar workloads.

9. The method of claim 1 wherein the similar functional tasks are tasks that apply a same policy.

10. The method of claim 1, further comprising:
    identifying a policy that specifies a type of the action to perform based on an extent of the difference between the statistical evaluation and the baseline measurement.

11. The method of claim 10, wherein the policy specifies that a first action is to be performed if the difference between the statistical evaluation and the baseline measurement exceeds a threshold or a second action is to be performed if the difference between the statistical evaluation and the baseline measurement is lower than the threshold, and wherein the first action comprises removing the first member from the cluster and the second action comprises recycling the first member.

12. A system, comprising:
    a cluster comprising a plurality of member computing nodes including a first member, the cluster configured to execute a dedicated microservice of a service-oriented system architecture, the microservice comprising a collection of similar functional tasks; and
    a coordinator associated with but separate from the cluster of computing nodes, wherein the coordinator is configured to:
        collect metric data associated with the cluster, the metric data including first metric data associated with the first member, wherein the metric data is collected during one or more reporting cycles during which a recycle is performed on each member of the cluster on a random basis to diversify the metric data, and wherein the recycle performed on each member of the cluster is staggered with respect to the recycle performed on at least one other member of the cluster;
        calculating a statistical evaluation for the first member based on at least the first metric data, the statistical evaluation representing an inferred proportion value of the first member to collective members of the cluster;
        calculating a baseline measurement for the collective members of the cluster;
        compare the statistical evaluation for the first member with the baseline measurement;
        identify a soft failure at the first member based on a difference between the statistical evaluation and the baseline measurement; and
        in response to identifying the soft failure at the first member, determine an action associated with a cluster management technique of the service-oriented system architecture to enable the cluster of computing nodes to continue execution of the microservice despite the soft failure at the first member.

13. The system of claim 12 further comprising:
    a data store that:
        receives second metric data for the collective members in the cluster; and
        stores the second metric data for retrieval by the coordinator.

14. The system of claim 13 wherein the coordinator is further configured to:
    identify, based on the difference between the statistical evaluation and the baseline measurement, a policy that controls the action to perform for the identified soft failure.

15. The system of claim 12, wherein the cluster is a first cluster and the microservice is a first type of microservice, the system further comprising:
    a second cluster that is dedicated to a second type of microservice that is different from the first type of microservice.

16. The system of claim 12 further comprising:
    a cluster manager that executes the action at the first member.

17. The system of claim 12, wherein the action to be performed at the first member includes at least one of the following: recycling the first member, scaling out the cluster by adding a second member, or scaling in the cluster by removing the first member.

18. A non-transitory machine-readable storage medium comprising instructions that when executed by a processing resource cause a a set of operations to be performed comprising:
    collecting metric data associated with a cluster comprising a plurality of member computing nodes, the metric data including first metric data associated with a first member in the cluster, the cluster executing a dedicated microservice of a service-oriented system architecture, the microservice comprising a collection of similar functional tasks;
    performing a recycle on each member in the cluster on a random basis to diversify the metric data, wherein each member performs the recycle at different times;
    calculating a statistical evaluation for the first member based on at least the first metric data, the statistical evaluation representing an inferred proportion value of the first member to collective members of the cluster;
    calculating a baseline measurement for the collective members of the cluster;
    comparing, by a coordinator associated with but separate from the cluster of computing nodes, the statistical evaluation for the first member with the baseline measurement;
    detecting a soft failure at the first member based on a difference between the statistical evaluation and the baseline measurement, wherein the soft failure creates degradation at one or more layers of the service-oriented system architecture that if unaddressed leads to a hard failure that catastrophically affects a multi-layer application provided on behalf of the service-oriented system architecture;
    responsive to detecting the soft failure at the first member, determining an action to perform at the first member to address the soft failure among multiple candidate actions; and
    relaying instructions to the first member to execute the action.

19. The non-transitory machine-readable storage medium of claim 18 wherein calculating the statistical evaluation for the first member comprises:
    obtaining current metric data associated with each of the collective members; and
    calculating the statistical evaluation for each of the collective members based on the current metric data.

20. The non-transitory machine-readable storage medium of claim 19 wherein the set of operations further comprises:
   identifying, based on the difference between the statistical evaluation and the baseline measurement, a policy that controls the action to be performed at the first member to address the soft failure.

21. The non-transitory machine-readable storage medium of claim 18 the set of operations comprising:
   executing the action at the first member experiencing the soft failure.

22. The non-transitory machine-readable storage medium of claim 18 wherein the multiple candidate actions include at least one of the following: recycling the first member, scaling out the cluster by adding a second member, or scaling in the cluster by removing the first member.

* * * * *